(12) United States Patent
Boucher et al.

(10) Patent No.: US 10,407,154 B2
(45) Date of Patent: Sep. 10, 2019

(54) HORIZONTAL STABILIZER MOUNT FOR A ROTORCRAFT

(71) Applicant: Bell Helicopter Textron Inc., Fort Worth, TX (US)

(72) Inventors: Guillaume Noiseux Boucher, Mirabel (CA); Pascal Flynn-Robitaille, Laval (CA); Kevin Donald Morris, Hawkesbury (CA)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 354 days.

(21) Appl. No.: 15/490,796

(22) Filed: Apr. 18, 2017

(65) Prior Publication Data
US 2018/0297689 A1  Oct. 18, 2018

(51) Int. Cl.
  *B64C 9/02* (2006.01)
  *B64C 5/02* (2006.01)
  *B64C 27/06* (2006.01)
  *B64C 27/82* (2006.01)
  *B64C 1/26* (2006.01)

(52) U.S. Cl.
  CPC ............ *B64C 9/02* (2013.01); *B64C 1/26* (2013.01); *B64C 5/02* (2013.01); *B64C 27/06* (2013.01); *B64C 27/82* (2013.01); *B64C 2027/8281* (2013.01)

(58) Field of Classification Search
  CPC .... B64C 5/10; B64C 5/02; B64C 9/02; B64C 9/06; B64C 27/00; B64C 27/04
  See application file for complete search history.

(56) References Cited

U.S. PATENT DOCUMENTS

| 2012/0138739 A1 | 6/2012 | Lhermenault et al. |
| 2013/0087662 A1* | 4/2013 | Soenarjo ............ B64C 9/16 244/215 |
| 2017/0225778 A1* | 8/2017 | Waltner ............ B64C 27/82 |

(Continued)

FOREIGN PATENT DOCUMENTS

| EP | 0007317 A2 | 1/1980 |
| EP | 0007317 A3 | 2/1980 |

(Continued)

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014 (1 page).

(Continued)

*Primary Examiner* — J. Woodrow Eldred
(74) *Attorney, Agent, or Firm* — Patent Capital Group (57) ABSTRACT

In one embodiment, a horizontal stabilizer spar is held on the empennage of a rotorcraft by saddle fittings clamping the stabilizer spar at positions spaced apart along a longitudinal direction of the stabilizer spar. Stabilizer mounts are connected at respective ends to the saddle fittings and to vertical spars on the empennage. At least one of the stabilizer mounts is constructed to allow movement of the saddle fittings with respect to the vertical spars with at least four directions of freedom. The movable stabilizer mount is floatingly attached to a vertical spar, while the saddle fittings are connected to the respective stabilizer mounts by way of spherical bearings.

20 Claims, 8 Drawing Sheets

(56) References Cited

U.S. PATENT DOCUMENTS

2017/0334552 A1* 11/2017 Seifert ................. B64C 27/001
2018/0222577 A1*  8/2018 Goldman ............... B64C 27/46

FOREIGN PATENT DOCUMENTS

EP          2860100 A1    4/2015
EP          3392134 A1    10/2018

OTHER PUBLICATIONS

Perry, Dominic, "Analysis: Bell 525 Relentless Cutaway and Technical Description", Flight Global, Flight International, Bell Helicopter, Published Nov. 12, 2014 (8 pages).
EPO Search Report issued in EP Application 17182197.8 dated Feb. 2, 2018, 4 pages.

* cited by examiner

HORIZONTAL STABILIZER MOUNT FOR A ROTORCRAFT

TECHNICAL FIELD

This disclosure relates generally to aircraft performance, and more particularly, though not exclusively, to reducing empennage torsion/bending.

BACKGROUND

Aircraft are subjected to various aerodynamic and operational forces during operation. For example, the aerodynamic forces involved during operation of a rotorcraft may include thrust, drag, lift, and weight. In certain circumstances, aerodynamic and operational forces may increase the structural load on components of an aircraft and may also cause vibration. Excessive loads during operation of an aircraft (e.g., torsion and bending of the empennage of a helicopter) are undesirable and potentially harmful to the aircraft, as they can negatively impact the structural integrity, mechanical integrity, and performance of the aircraft. For example, loads, in particular asymmetric loads can cause components of an aircraft to bend and twist, and may reduce the structural integrity and fatigue life of the aircraft.

SUMMARY

According to one aspect of the present disclosure, a horizontal stabilizer mount for a rotorcraft includes a plurality of saddle fittings holding a stabilizer spar at positions spaced apart along a longitudinal direction of the stabilizer spar; and stabilizer mounts having first and second ends, wherein the first ends are attached to respective ones of the saddle fittings at the spaced-apart positions and the second ends are attached to respective vertical spars disposed on the rotorcraft. At least one of the stabilizer mounts is constructed to allow movement of the saddle fittings with respect to the vertical spars with at least four directions of freedom.

According to another aspect of the present disclosure, a horizontal stabilizer of a rotorcraft includes a stabilizer spar, a plurality of saddle fittings fittings arranged at spaced-apart positions along a longitudinal direction of the stabilizer spar holding and clamping the stabilizer spar, and stabilizer mounts having first and second ends, wherein the first ends are attached to respective ones of the saddle fittings at the spaced-apart positions and the second ends are attached to respective vertical spars disposed on the rotorcraft. At least one of the stabilizer mounts is constructed to allow movement of the saddle fittings with respect to the vertical spars with at least four directions of freedom.

According to yet another aspect of the present disclosure, a rotorcraft includes a fuselage with an empennage attached to the fuselage, a horizontal stabilizer spar attached to the empennage, and a skin assembly covering parts of the horizontal stabilizer spar. The horizontal stabilizer spar is attached to the empennage by way of the aforedescribed stabilizer mounts that allow movement of the horizontal stabilizer spar with respect to the empennage with at least four directions of freedom.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In this specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "spaced-apart" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1A:
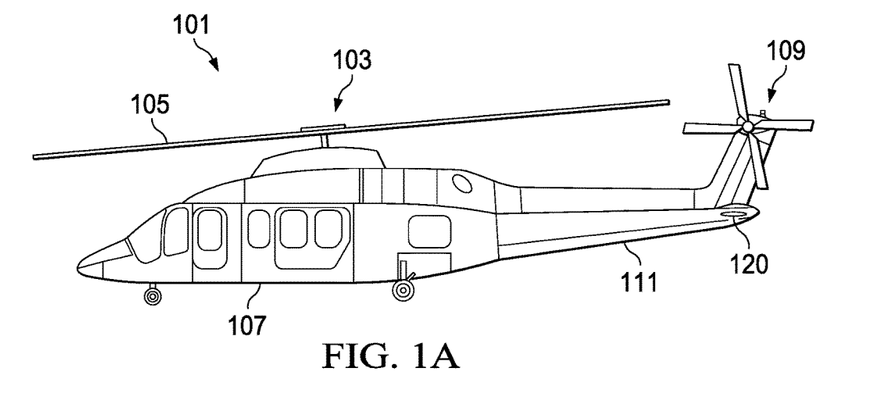
FIGS. 1A-B illustrate an example rotorcraft in accordance with certain embodiments.
Figure 1B:
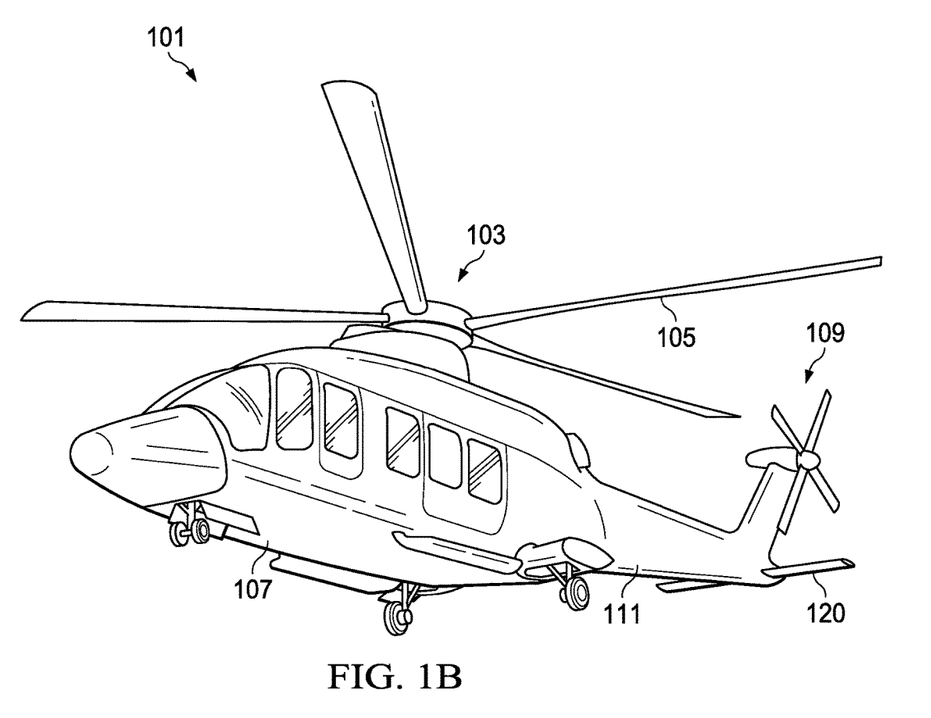

FIG. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 can be managed or adjusted in order to selectively control direction, thrust, and lift of rotorcraft 101. Rotorcraft 101 further includes a fuselage 107, anti-torque system 109, an empennage 111, and a tail structure 120. In this example, the tail structure 120 may represent and/or include a horizontal stabilizer. Torque is supplied to rotor system 103 and anti-torque system 109 using at least one engine.

It should be appreciated that rotorcraft 101 of FIG. 1 is merely illustrative of a variety of aircraft that can be used to implement embodiments of the present disclosure. Other aircraft implementations can include, for example, tiltrotor aircraft, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

A rotorcraft (e.g., rotorcraft 101) is subjected to various aerodynamic or operational forces during operation, including thrust, drag, lift, and weight. In certain circumstances, the aerodynamic forces may increase the structural load on components of the rotorcraft. Excessive loads during operation of a rotorcraft (e.g., tail loads) are undesirable and potentially harmful to the rotorcraft, as they can negatively impact the structural integrity, mechanical integrity, and performance of the rotorcraft. For example, torsion and bending loads can cause the components of a rotorcraft to bend and twist, and may reduce the structural integrity and fatigue life of the rotorcraft, in particular when the tail section of a rotorcraft has a reduced cross section, and load-bearing components, such as a stabilizer, are attached to end sections of the empennage. Accordingly, there is a need to control or reduce transfer of bending and twisting loads to structural components of a rotorcraft during operation.

In some cases, the loads of rotorcraft components (e.g., loads of the tail structure or empennage) may be addressed by stiffening structural components. Stiffening a structural component of a rotorcraft, for example, may be achieved by adding additional composite plies to strengthen the component. These approaches, however, can be inefficient and may have various drawbacks. For example, once a rotorcraft has been designed and the manufacturing tooling has been built, redesigning the rotorcraft to stiffen components and/or redistribute mass (e.g., redesigning the tail structure) may require intrusive design and tooling modifications, which may be cost prohibitive and time consuming. Redesigning certain components of the rotorcraft may also trigger a cascading chain of design and tuning modifications to other components of the rotorcraft. Moreover, these approaches can also be ineffective solutions for reducing the loads during operation of a rotorcraft. For example, while stiffening a component may increase its strength, stiffening also results in additional weight and may increase the load on other component.

Accordingly, there is a need for an efficient and effective approach for compensating for manufacturing and assembly tolerances and for preventing transfer of torsional and bending loads, for example from a horizontal stabilizer, to the empennage during assembly, maintenance and operation of rotorcraft. This disclosure describes various embodiments for reducing transfer of torsional and bending loads by supporting the horizontal stabilizer on the empennage with at least two brackets or stabilizer mounts, wherein one of the brackets or stabilizer mounts is fixedly attached to one side of the empennage, whereas the other bracket or stabilizer mount is floatingly attached to the other side of the empennage to allow limited movement in the longitudinal direction of the horizontal stabilizer.

The embodiments described throughout this disclosure provide numerous technical advantages, including using lightweight, flexible mounts of the horizontal stabilizer on the tail section of the rotorcraft, which can be implemented without disturbing the aerodynamics and airflow of the aircraft. Moreover, the described embodiments can be implemented on an aircraft even after it has been designed and the manufacturing tooling has been built, thus avoiding intrusive design and tooling modifications that are cost-prohibitive and time consuming.

Example embodiments for reducing torsion and bending loads on the empennage of a rotorcraft are described below with more particular reference to the remaining FIGURES.

Figure 2:
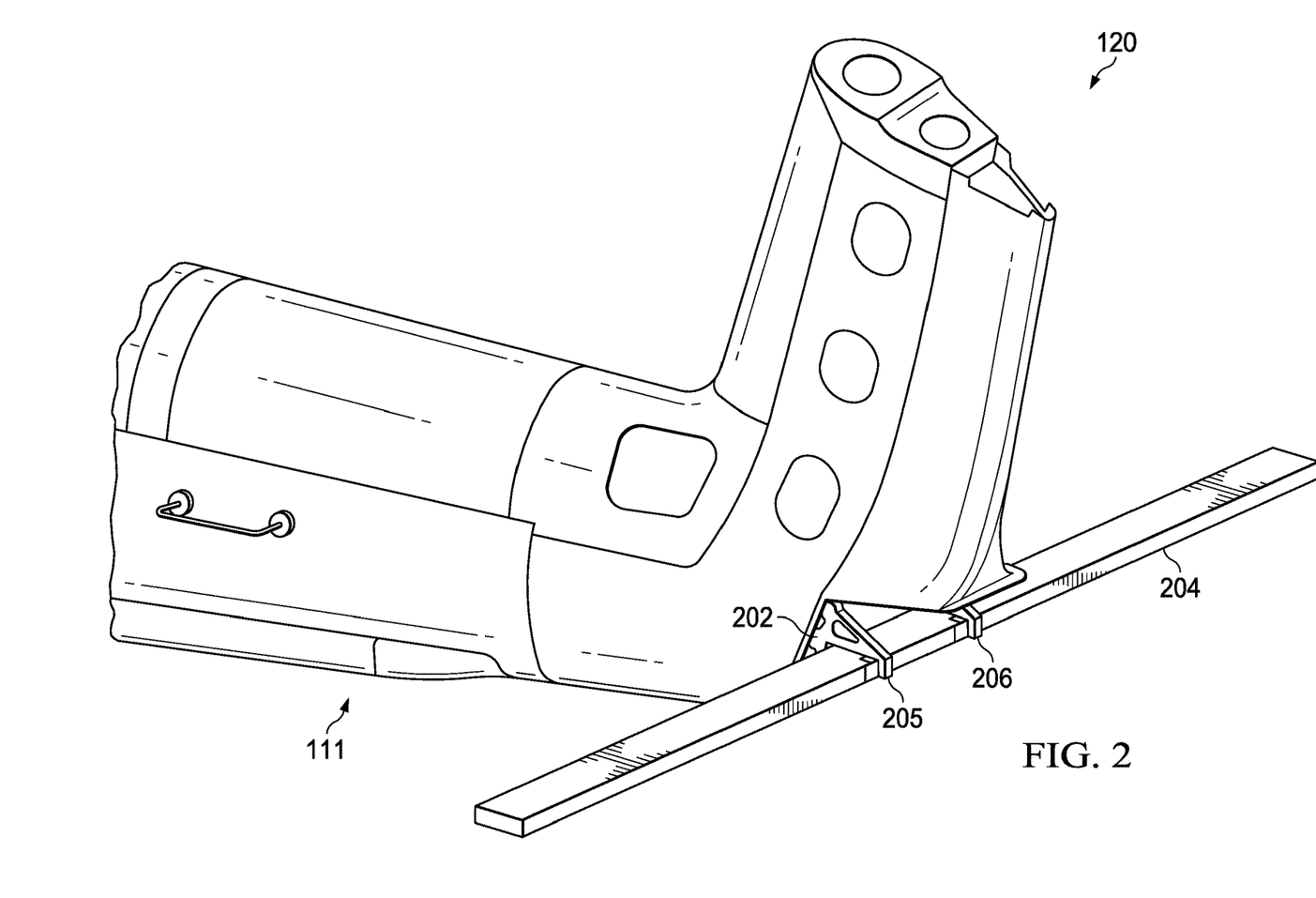
FIG. 2 illustrates an example embodiment of a rotorcraft empennage with an H-stab spar in an exploded view in accordance with certain embodiments.

FIG. 2 shows an H-stab spar 204 attached by a left-hand (LH) H-stab mount 205 and a right-hand (RH) H-stab mount 206 to respective left-hand and right-hand vertical fin spars 202 of the tail structure 120. The H-stab spar 204 is typically enclosed by a skin assembly directing airflow (schematically shown as 810 in FIG. 8) and aiding in control of the attitude of the rotorcraft during horizontal flight. Attaching the H-stab spar 204 at a readily accessible location near the aft end of the empennage 111 facilitates installation, adjustment and replacement of the H-stab spar 204 and the associated skin assembly 810.

Figure 3:
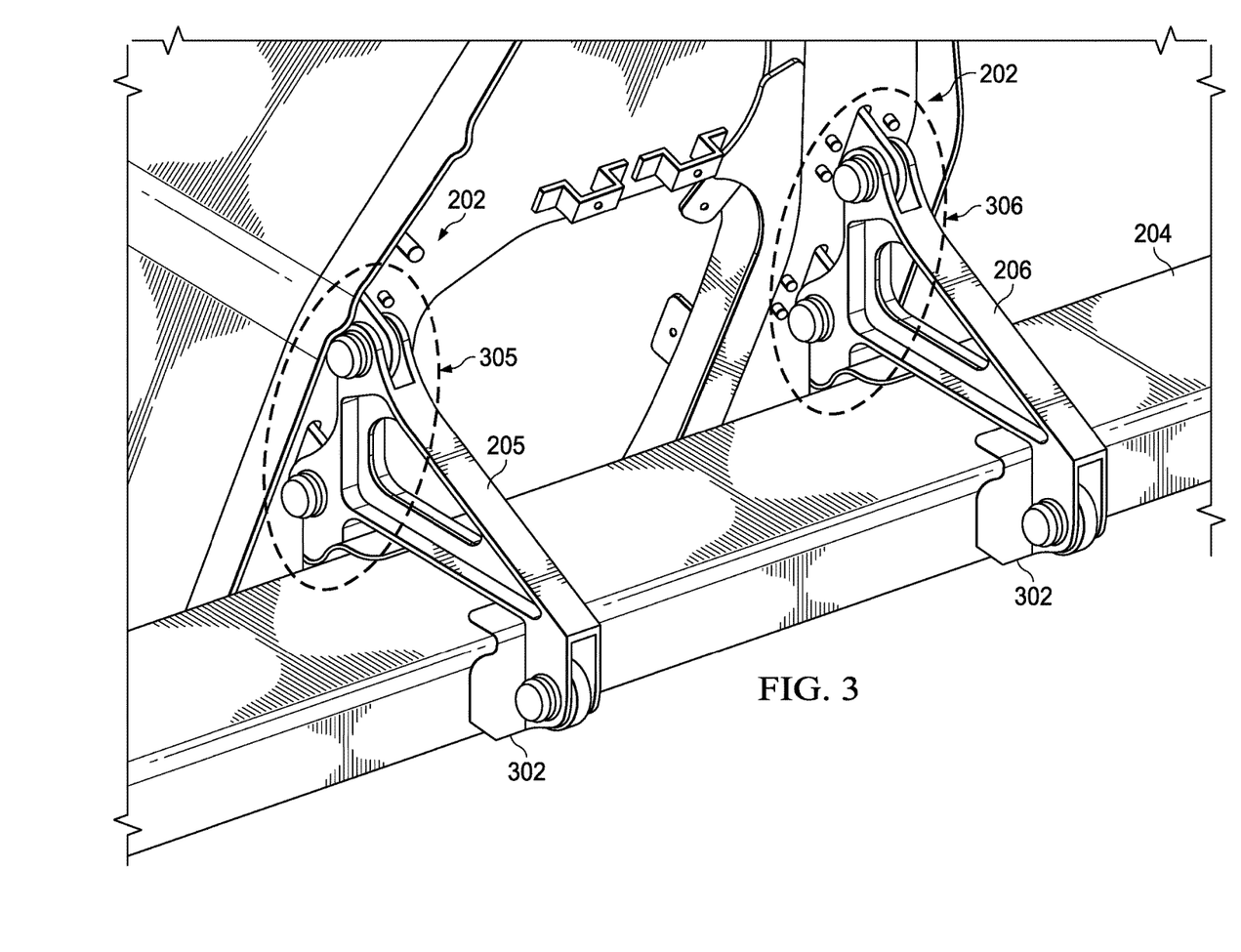
FIG. 3 illustrates clamped and floating attachment of H-stab mounts on the vertical spars of the empennage in accordance with certain embodiments.

FIG. 3 shows in greater detail the attachment of the H-stab spar 204 to the respective vertical fin spars 202. The H-stab spar 204 is held in place by four H-stab saddle fittings 302 which laterally grip the H-stab spar 204 at the forward and aft edges, and which are in turn attached to a respective LH H-stab mount 205 and a RH H-stab mount 206. FIG. 3 also shows in greater detail the attachment of the LH H-stab mount 205 and the RH H-stab mount 206 to the vertical fin spars 202 at respective locations 305 and 306.

As mentioned above, the horizontal stabilizer and hence the H-stab spar 204 can experience bending and twisting forces, in particular during horizontal (forward) flight, which forces can then be transferred to the tail section of the empennage 111. Since this portion of the tail section is quite narrow, the transferred bending and twisting forces can be substantial, which may cause material fatigue and even catastrophic failure of the tail section. Reinforcing the tail section causes the weight of the rotorcraft to increase, which would be undesirable.

To alleviate this problem and to reduce the transfer of forces to the tail section of the empennage 111, the solution proposed in present disclosure is designed to accommodate forces and torques applied both along and perpendicular to the longitudinal direction (Y-direction) of the H-stab spar 204. Forces in the Y-direction can be accommodated, in the example illustrated in FIG. 3, for example by constructing the LH H-stab mount 205 as a fixed mount 305 that is clamped to the respective vertical fin spar 202 and thus holds the H-stab spar 204 at a defined position in the Y-direction. Conversely, the RH H-stab mount 206 is constructed as a floating mount 306 which allows limited movement in the Y-direction. It will be understood that the floating mount 306 may accommodate both manufacturing and assembly tolerances of the H-stab mount 206 as well as forces exerted on the H-stab spar 204 during operation of the rotorcraft, thus obviating the need for shimming or preloading at installation. It will also be understood that the left-hand and right-hand sides can be interchanged, i.e. it is immaterial which side is floating and which side is fixed.

Figure 4:
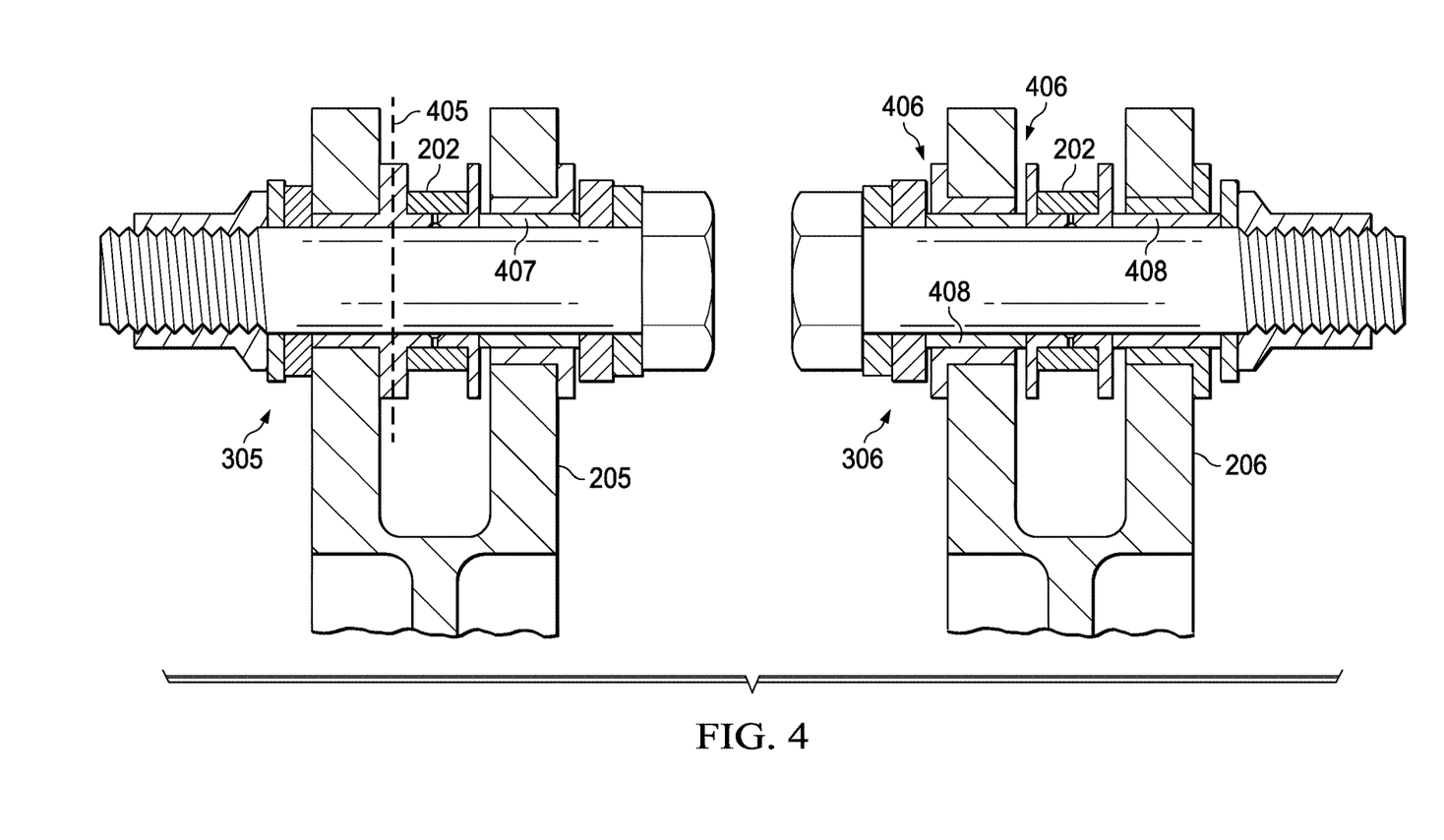
FIG. 4 illustrates in more detail the clamped and floating attachment of the H-stab mounts on the vertical spars of the empennage.

FIG. 4 shows in more detail the clamped attachment 305 on LH H-stab mount 205 to the respective vertical fin spar 202. The (in relation to the vertical fin spar 202) fixed clamping plane is indicated by 405. One side of the fork of the H-stab mount 205 is seated on a sleeve 407 to accommodate for example manufacturing tolerances of the fork opening. Importantly, however, the H-stab mount 205 is prevented from moving in the Y-direction. Conversely, the attachment of the RH H-stab mount 206 to the respective vertical fin spar 202 is a floating attachment 306 which allows limited movement of the RH H-stab mount 206 on sleeves 408 in the Y-direction. This attachment of the LH and RH H-stab mounts 305, 206 on the vertical fin spars 202 reduces or eliminates transfer of force differences between stab mounts 205 and 206 from the H-stab 204 to the tail section of the empennage 111 in the Y-direction. The fixed and floating attachment, respectively, applies to both the upper and the lower bolted connections 305, 306 shown in FIG. 3.

Figure 5:
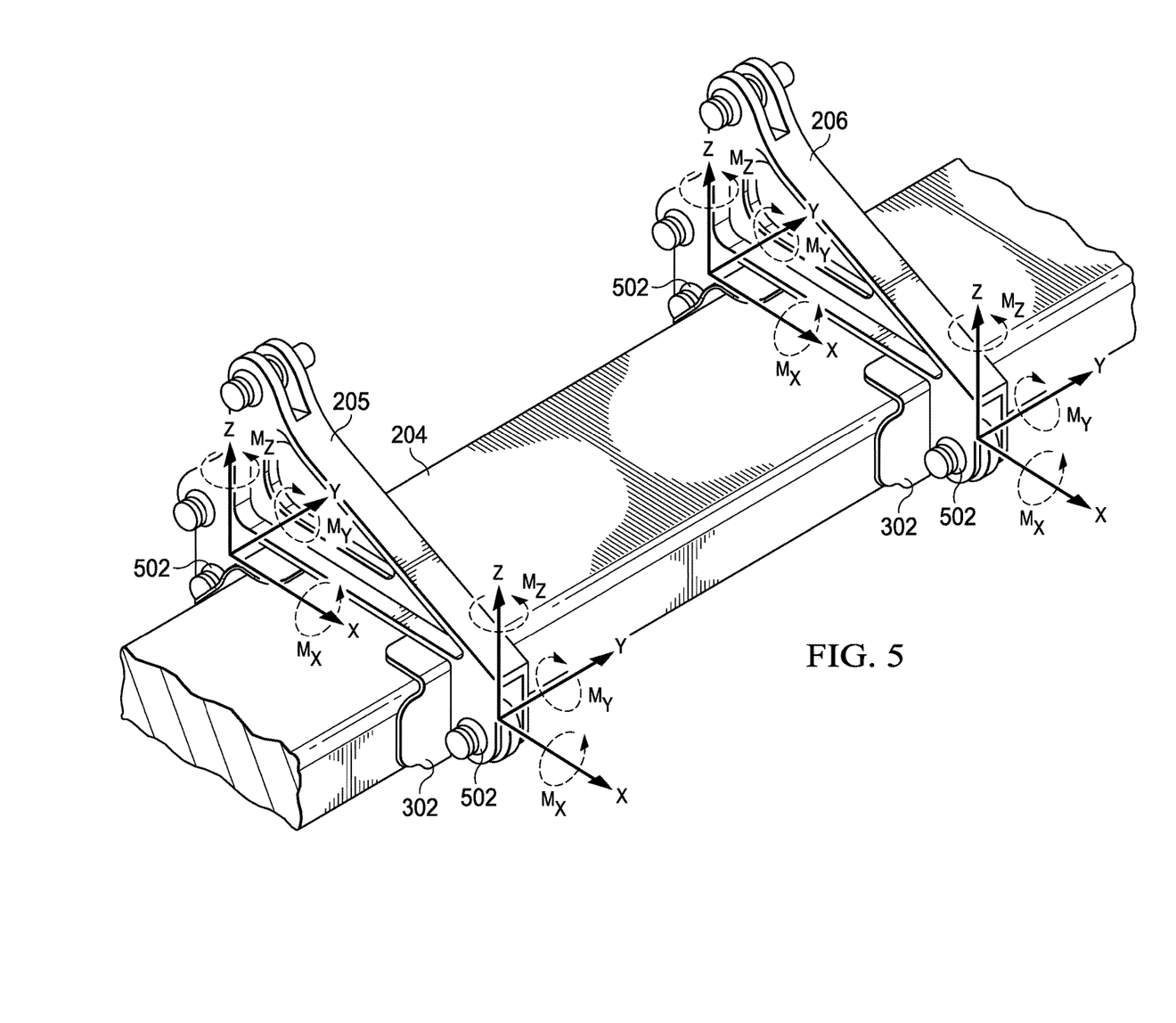
FIG. 5 illustrates attachment of the H-stab saddle fittings to the H-stab mounts by way of spherical bearings in accordance with certain embodiments.

As mentioned above and indicated schematically in FIG. 5, the H-stab spar 204 may not only exert forces in the Y-direction, but also moments in the Y-direction and in the orthogonal X- and Z-directions. As indicated in FIG. 5, the X-, Y- and Z-directions are with reference to a global coordinate system, wherein the X-direction is aft, the Y-direction is outboard from the right-hand side, and the Z-direction is vertical up. These directions apply, although not specifically indicated, also to FIG. 3 and FIG. 4. The moments in the respective X-, Y- and Z-directions are indicated in FIG. 5 by $M_x$, $M_y$ and $M_z$ and are caused by bending and twisting of the H-stab spar 204. It is evident from FIG. 5 that if the H-stab mounts 205, 206 were rigidly connected to the saddle fittings 302, these moments $M_x$, $M_y$ and $M_z$ could be transferred from the H-stab spar 204 to the respective H-stab mounts 205, 206 at the locations where the H-stab saddle fittings 302 holding the H-stab spar 204 are attached to the H-stab mounts 205, 206.

Figure 6:
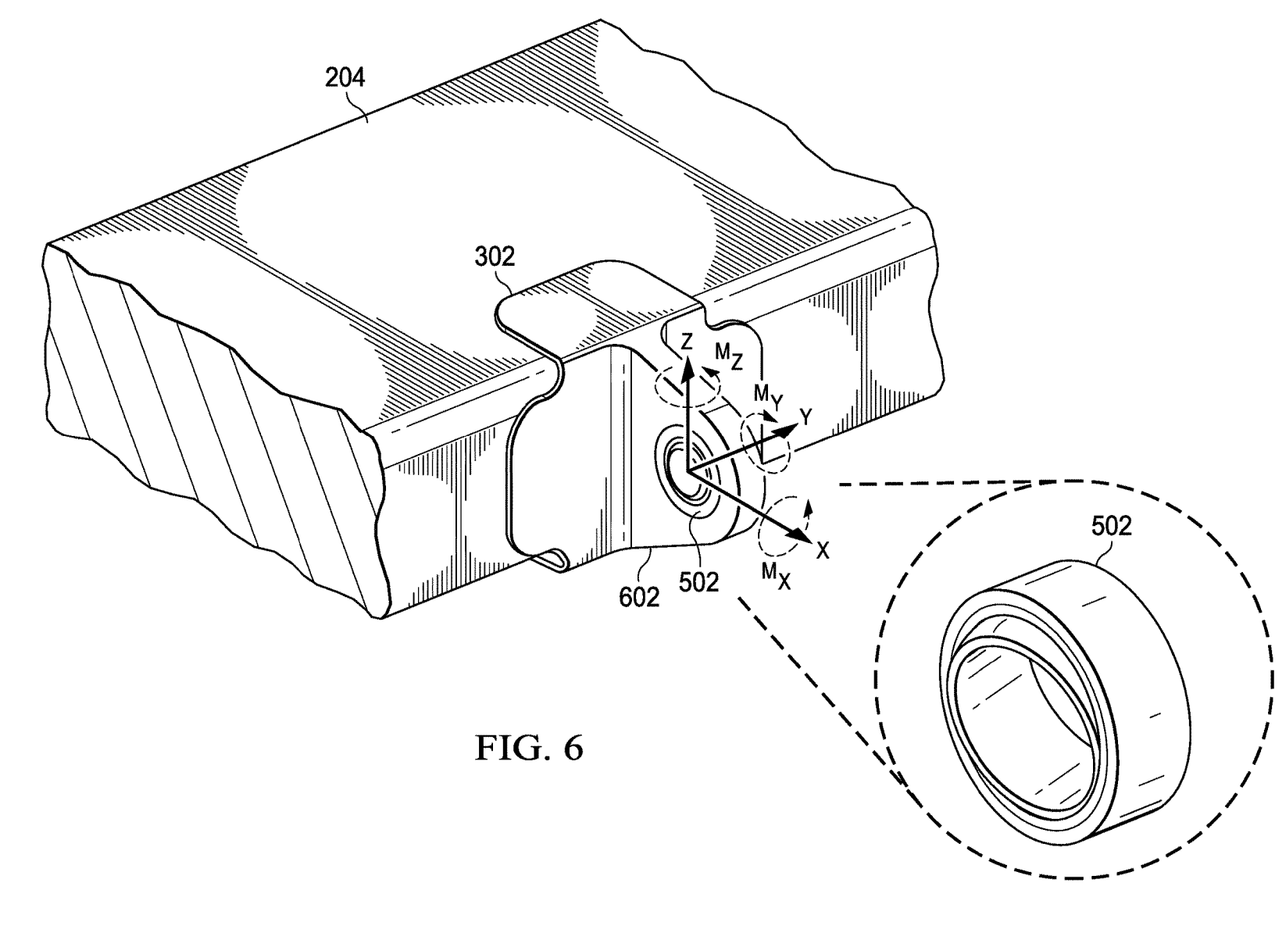
FIG. 6 illustrates a detail of a spherical bearing of the H-stab saddle fittings.

Transfer of the moments $M_x$, $M_y$ and $M_z$ can be prevented by coupling the H-stab saddle fittings 302 to the H-stab mounts 205, 206 by way of spherical bearings 502 which are shown in more detail in FIG. 6. The inset in FIG. 6 shows an exemplary conventional spherical plain bearing. Spherical bearings are typically used wherever rotational motion must be allowed to change the alignment of its rotation axis. A spherical bearing consists of an outer ring and an inner ring and a locking feature that makes the inner ring captive within the outer ring in the axial direction only. The outer surface of the inner ring and the inner surface of the outer ring are spherical (or more correctly, toroidal) and are collectively considered the raceway and they slide against each other, for example with a lubricant, or maintenance-free with a liner, or they incorporate a rolling element such as a race of ball-bearings, which reduces friction. The spherical bearing 502 can be, for example, pressed into a corresponding opening in a projection 602 of the saddle fitting 302.

Figure 7:
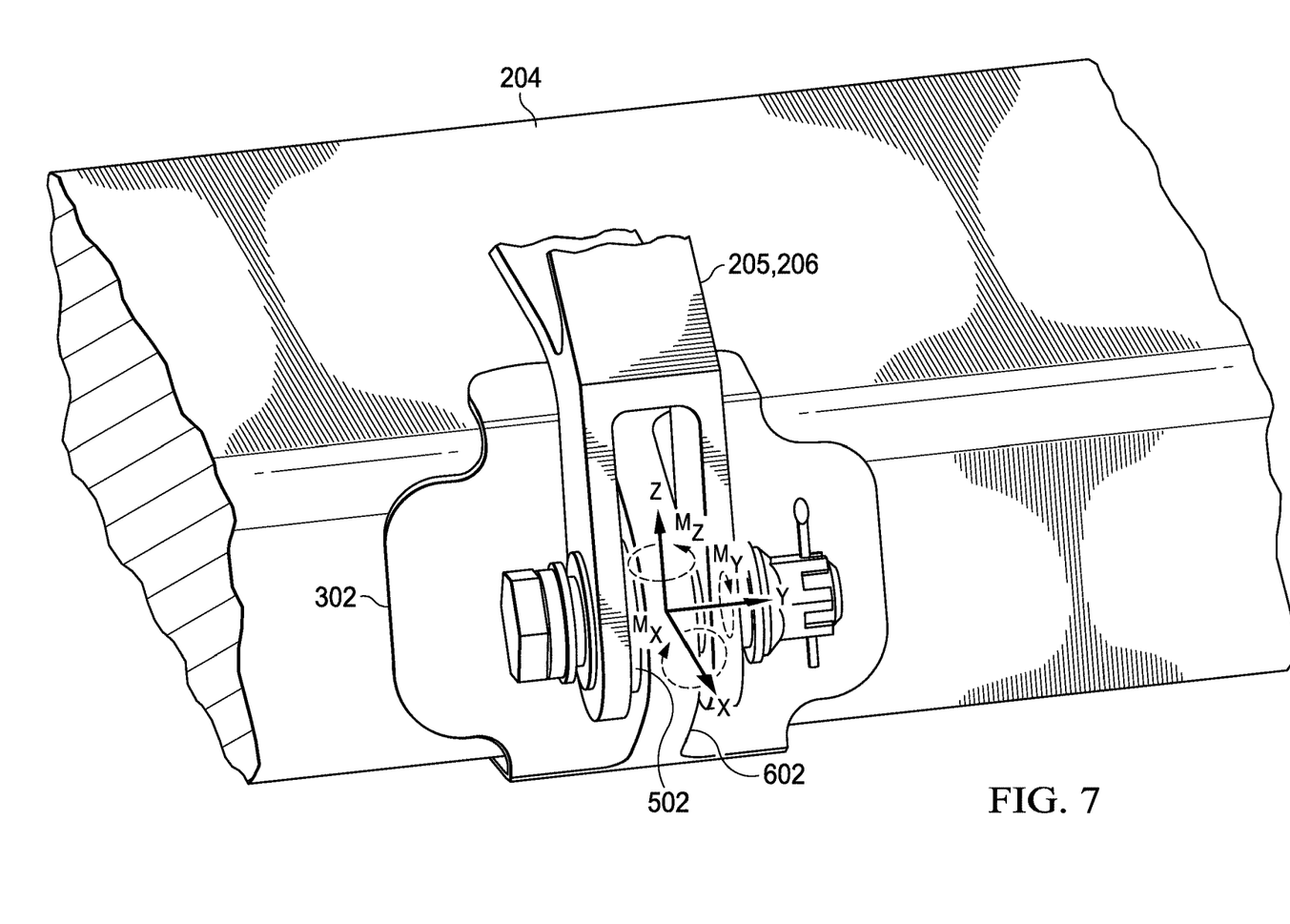
FIG. 7 illustrates degrees of freedom of movements provided by the spherical bearing.

FIG. 7 shows details of the attachment of the H-stab saddle fitting 302 to the H-stab mounts 205, 206 by way of the spherical bearing 502. The spherical bearing 502 locks the position of the H-stab mounts 205, 206 relative to the H-stab saddle fitting 302 in the X- and Z-directions while allowing translation in the Y-direction. Furthermore, only shear forces are transmitted from the saddle fittings 302 to the H-stab mounts 205, 206, because the spherical bearing 502 allows independent limited rotation about the X-, Y- and Z-axes, thus decoupling $M_x$, $M_y$ and $M_z$. To this end, the thickness of the projection (lug) 602 of the H-stab saddle fitting 302 is designed to be less than the unobstructed width between the legs of the fork accommodating the projection 602. The resulting clearance between the legs and the projection 602 allows the rotation in three orthogonal directions characteristic for a spherical bearing and translation in the Y-direction. All the aforedescribed connections are implemented in a conventional manner with bolts and lock nut with cotter pins, although other known type of lock nut may be used.

While the FIGURES show the projection of the saddle fitting being received in a first fork on the H-stab mount and likewise a projection on the vertical spars being received in a second fork on the H-stab mount (FIG. 3), it can be readily seen that the locations of the projections and the forks can be interchanged without affecting or limiting the operation of the device.

Figure 8:
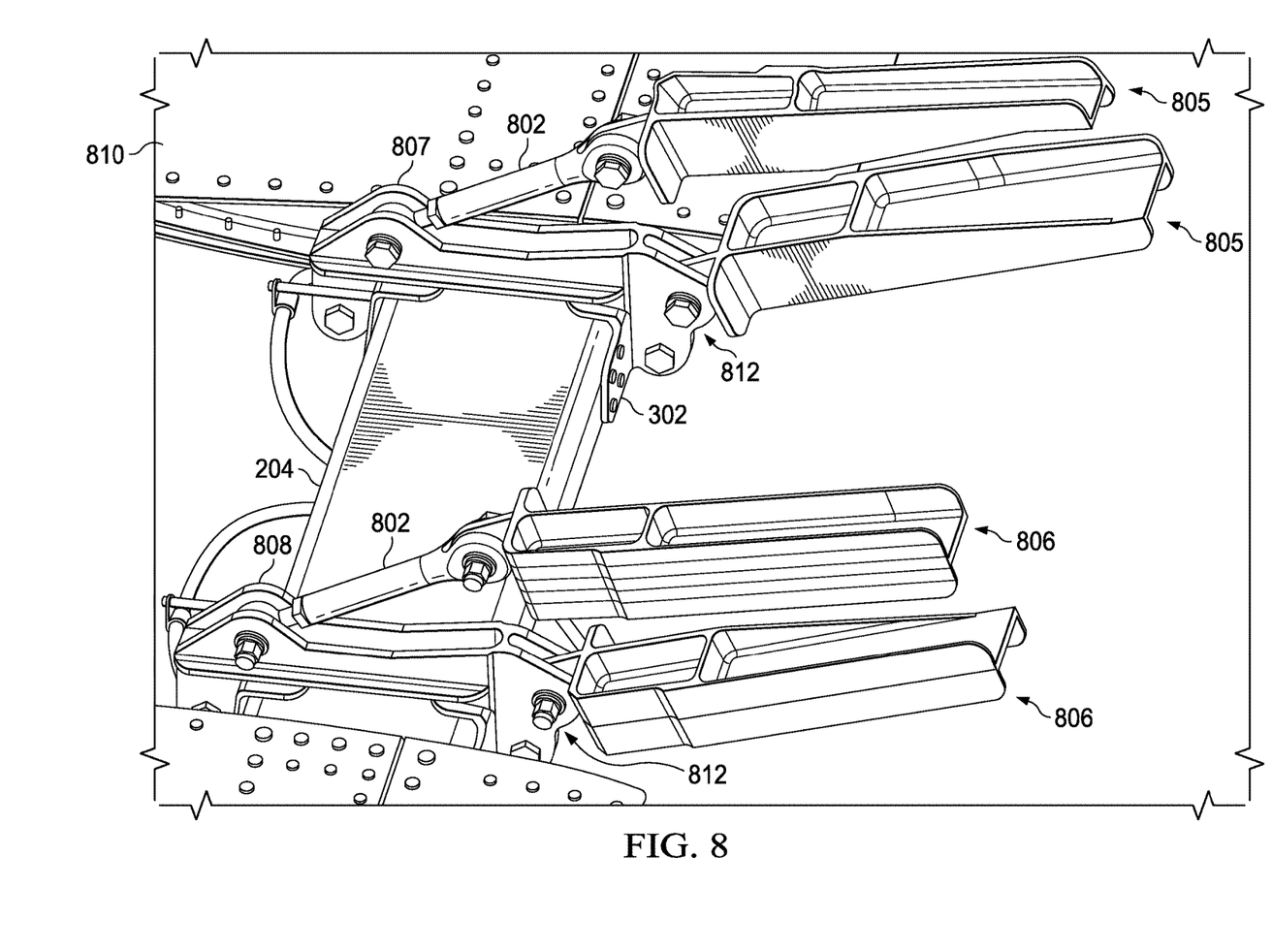
FIG. 8 illustrates attitude adjustment of the H-stab mounts with respect to the vertical spars of the empennage.

FIG. 8 illustrates a further embodiment according to the disclosure with pull rods 802 connected between H-stab mounts 805, 806 that are attached to vertical fin spars (not shown) and intercostals 807, 808 to which the H-stab saddle fittings 302 are in turn attached, as before. Depending on the type of the mounts 805, 806, by lengthening or shortening the rod pull rods 802, the attitude of the H-stab spar 204 can be adjusted by rotating the H-stab spar 204 about the Y-axis of the lower intercostal bolts 812. The position may be fixed upon installation of the H-stab spar 204 or may be made adjustable by using rods 802 whose length can be changed mechanically, electrically or hydraulically, for example.

The diagrams in the FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted.

Although certain embodiments have been described with reference to a rotorcraft, the embodiments are not limited to rotorcrafts but may also be used on aircrafts or cars, or any other type of apparatus or device that uses control surfaces.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A horizontal stabilizer mount for a rotorcraft, comprising:
   a plurality of saddle fittings holding a stabilizer spar at positions that are spaced apart along a longitudinal direction of the stabilizer spar; and stabilizer mounts having first and second ends, wherein the first ends are attached to respective ones of the saddle fittings at the spaced-apart positions and the second ends are attached to respective vertical spars disposed on the rotorcraft, wherein at least one of the stabilizer mounts is constructed to allow movement of the saddle fittings with respect to the vertical spars with at least four directions of freedom.

2. The horizontal stabilizer mount of claim 1, wherein the second end of a first of the stabilizer mounts is attached to the respective vertical spar by way of a fixed bearing which prevents the first stabilizer mount from being displaced in the longitudinal direction of the stabilizer spar.

3. The horizontal stabilizer mount of claim 2, wherein the second end of at least one second stabilizer mount is floatingly attached to the respective vertical spar, allowing the at least one second stabilizer mount to be displaced in the longitudinal direction of the stabilizer spar.

4. The horizontal stabilizer mount of claim 1, wherein respective first ends of the stabilizer mounts are each attached to a respective saddle fitting by way of a spherical bearing which allow the respective saddle fitting to rotate with respect to the respective first end about three orthogonal directions.

5. The horizontal stabilizer mount of claim 1, wherein each of the plurality of saddle fittings comprises a projection with an opening, and wherein the spherical bearing is held captive in the opening.

6. The horizontal stabilizer mount of claim 5, wherein the first ends of the stabilizer mounts are constructed as a fork with spaced-apart legs, and wherein the projection with the captive spherical bearing is accommodated between the legs.

7. The horizontal stabilizer mount of claim 5, wherein the projection with the captive spherical bearing is secured between the legs by a bolt extending through the spherical bearing and the legs.

8. The horizontal stabilizer mount of claim 6, wherein a width of the projection is smaller than a width of a gap between the legs.

9. The horizontal stabilizer mount of claim 1, further comprising at least one adjustable pull rod operatively connected between the first end and the second end of a respective stabilizer mount and configured to adjust at least the attitude of the stabilizer spar with respect to the rotorcraft.

10. A horizontal stabilizer of a rotorcraft
a stabilizer spar;
a plurality of saddle fittings arranged at spaced-apart positions along a longitudinal direction of the stabilizer spar holding and clamping the stabilizer spar; and
stabilizer mounts having first and second ends, wherein the first ends are attached to respective ones of the saddle fittings at the spaced-apart positions and the second ends are attached to respective vertical spars disposed on the rotorcraft,
wherein at least one of the stabilizer mounts is constructed to allow movement of the saddle fittings with respect to the vertical spars with at least four directions of freedom.

11. The horizontal stabilizer of claim 10, wherein the second end of a first of the stabilizer mounts is attached to the respective vertical spar by way of a fixed bearing which prevents the first stabilizer mount from being displaced in the longitudinal direction of the stabilizer spar.

12. The horizontal stabilizer of claim 11, wherein the second end of at least one second stabilizer mount is floatingly attached to the respective vertical spar, allowing the at least one second stabilizer mount to be displaced in the longitudinal direction of the stabilizer spar.

13. The horizontal stabilizer of claim 10, wherein respective first ends of the stabilizer mounts are each attached to a respective saddle fitting by way of a spherical bearing which allow the respective saddle fitting to rotate with respect to the respective first end about three orthogonal directions.

14. The horizontal stabilizer of claim 10, wherein each of the plurality of saddle fittings comprises a projection with an opening, and wherein the spherical bearing is held captive in the opening.

15. The horizontal stabilizer of claim 14, wherein the first ends of the stabilizer mounts are constructed as a fork with spaced-apart legs, and wherein the projection with the captive spherical bearing is accommodated between the legs.

16. The horizontal stabilizer of claim 15, wherein a width of the projection is smaller than a width of a gap between the legs.

17. The horizontal stabilizer of claim 10, further comprising at least one adjustable pull rod operatively connected between the first end and the second end of a respective stabilizer mount and configured to adjust an attitude of the stabilizer spar with respect to the rotorcraft.

18. A rotorcraft, comprising
a fuselage, and an empennage attached to the fuselage;
a horizontal stabilizer spar attached to the empennage;
a skin assembly covering parts of the horizontal stabilizer spar;
a plurality of saddle fittings arranged at spaced-apart positions along a longitudinal direction of the stabilizer spar holding and clamping the stabilizer spar; and
stabilizer mounts having first and second ends, wherein the first ends are attached to respective ones of the saddle fittings at the spaced-apart positions and the second ends are attached to respective vertical spars disposed on the rotorcraft,
wherein at least one of the stabilizer mounts is constructed to allow movement of the saddle fittings with respect to the vertical spars with at least four directions of freedom.

19. The rotorcraft of claim 18, wherein at least one stabilizer mount is floatingly attached to the respective vertical spar, allowing the at least one second stabilizer mount to be displaced in the longitudinal direction of the stabilizer spar.

20. The rotorcraft of claim 18, wherein the stabilizer mounts are each attached to a respective saddle fitting by way of a spherical bearing which allow the respective saddle fitting to rotate with respect to the respective stabilizer mount about three orthogonal axes.

* * * * *